July 3, 1951 — W. B. GREENLEE — 2,558,747

ELECTRIC LIGHTING SYSTEM

Filed Oct. 22, 1945 — 2 Sheets-Sheet 1

INVENTOR.
WILLIAM B. GREENLEE
BY
W. A. McGrew
ATTORNEY

July 3, 1951 W. B. GREENLEE 2,558,747
ELECTRIC LIGHTING SYSTEM
Filed Oct. 22, 1945 2 Sheets-Sheet 2
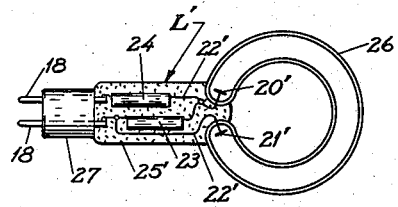
Fig. 6
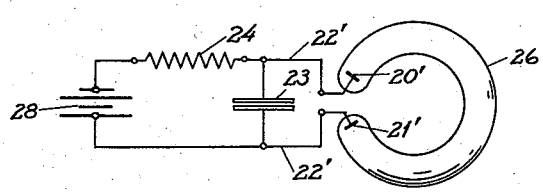
Fig. 7
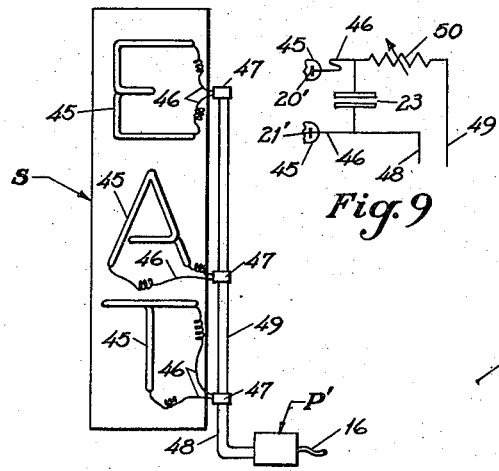
Fig. 8
Fig. 9
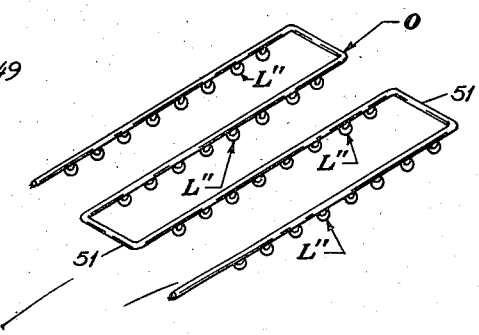
Fig. 10
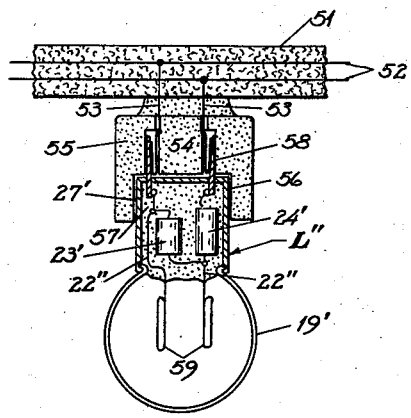
Fig. 11
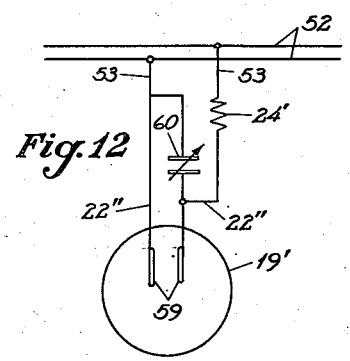
Fig. 12
INVENTOR.
WILLIAM B. GREENLEE
BY
ATTORNEY Patented July 3, 1951

2,558,747

UNITED STATES PATENT OFFICE 2,558,747

ELECTRIC LIGHTING SYSTEM

William B. Greenlee, Denver, Colo.

Application October 22, 1945, Serial No. 623,793

3 Claims. (Cl. 315—227)

This invention relates to electric lighting systems, and lighting or lamp units therefor, and particularly to ornamental lighting systems, and units therefor, such as utilized in connection with Christmas trees and for other decorative purposes, as for display signs and the like.

Among the objects of this invention are to provide an improved lighting system by which various decorative effects may be achieved; to provide such a system by which one or more gas-filled tubes or bulbs may be excited and discharged at predetermined intervals, either sufficiently slow to produce a blinking effect or sufficiently fast to simulate continuous light; to provide such a system which may operate from either an A. C. or D. C. power supply; to provide such a system in which a plurality of lamp units may be operated in parallel from a single source of current; to provide various lighting lamps or units, each particularly adapted to be used in such systems; to provide a lighting system, as well as a special unit therefor, which is particularly adapted for ornamenting Christmas trees and the like; to provide another system which is particularly adapted for use in electric signs or the like; to provide a further system particularly adapted for use in achieving desired decorative effects, such as lamps which may be regulated to blink at predetermined intervals to simulate the natural blinking of stars; to provide a lighting unit particularly useful in such system, and which is interchangeable with other lighting units; to provide such a lighting unit which is compact in construction; to provide such lighting units which are adjustable to regulate the blinking effect or lighting periods; to provide a lighting unit which includes a gas filled bulb or tube and is so constructed that resistance of leads is reduced to a minimum; and to provide such lighting systems, and lighting units therefor, which will be durable and effective in operation. Other objects and the novel features of this invention will become apparent from the description which follows.

In general, a lighting system of this invention may comprise a source of unidirectional current, a gas filled transparent bulb having at least two electrodes, a capacitor connected in parallel with two electrodes, and a resistor connected in series with one of the two electrodes. The lighting system of this invention may also comprise a source of unidirectional current, and a plurality of lighting units connected in parallel and supplied by the source, each lighting unit including a gas filled, gaseous discharge, transparent bulb or tube. Such lighting system may also include means for supplying the electrodes of one or more gas filled, gaseous discharge bulbs or tubes with a unidirectional electric current, having a voltage increasing periodically to a predetermined value at least equal to the ignition voltage of the bulb and alternately to a lower predetermined value at or below the excitation voltage of the bulb. The unidirectional current may be direct current, or rectified alternating current, either half or full wave.

The lighting or lamp unit of this invention may comprise a gas filled bulb or tube having a pair of electrodes, a condenser in parallel therewith, a resistor in series with one electrode, and a housing enclosing the condenser and resistor and attached or sealed to the bulb or tube.

Additional details of the lighting systems and units of this invention are illustrated in the accompanying drawings, in which:

Fig. 1 is a diagrammatic elevation of a lighting system constructed in accordance with this invention and utilized to provide decoration of a Christmas tree or the like;

Fig. 6 is a side view of an alternative lighting unit;

Fig. 7 is a circuit diagram illustrating the lighting unit of Fig. 6;

Fig. 8 is a partially diagrammatic elevation of an electric sign, which includes a lighting system also constructed in accordance with this invention;

Fig. 9 is a circuit diagram illustrating the lighting units of the system of Fig. 8;

Fig. 10 is an isometric drawing illustrating an ornamental lighting system, operable to simulate a plurality of stars and preferably mounted adjacent the ceiling of a room or the like;

Fig. 11 is a vertical section of a lighting unit and co-operating parts of the system of Fig. 10;

Fig. 12 is a circuit diagram illustrating a variation of the lighting unit of Fig. 11.

Figure 1:
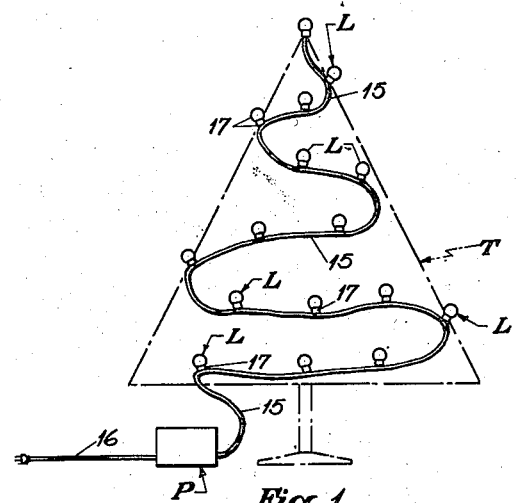

As illustrated in Fig. 1, a lighting system constructed in accordance with this invention may be utilized in achieving a decorative effect, as on a Christmas tree T. As shown, a plurality of lighting units L are connected in parallel to a double wire cable or cord 15, which is supplied with a unidirectional current—in this instance rectified A. C.—from a power unit P, the latter of which is supplied A. C. of a suitable voltage by a power lead 16. A plurality of sockets 17 are mounted at spaced intervals along cord 15, which may be wound about the tree to provide the desired decorative effect by spacing of the lighting units. Each socket includes a pair of terminals which are connected to respective wires of cord 15, and each socket is adapted to receive a lighting unit L which, as in Fig. 2, is provided with a pair of prongs 18 which contact the respective terminals in the socket.

Figure 2:
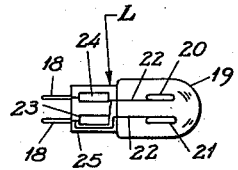
Fig. 2 is a side view of a lighting unit utilized in the system of Fig. 1.

Each lighting unit L, as in Fig. 2, includes a sealed bulb 19, formed of glass or other suitable transparent material and filled with a gaseous material such as one or a combination of rare gases, adapted to provide a gaseous discharge device to produce light of a desired color upon excitation. Thus, to provide a red color, a bulb 19 may be filled with neon gas; to provide a gold or golden yellow color, a bulb 19 may be formed of yellow glass and filled with helium gas; to provide a white color, a bulb 19 may be formed of fluorescent glass and filled with argon gas and a small amount of vaporizable mercury; to provide a blue or purple color, a bulb 19 may be white or shaded and filled with argon gas, and a small amount of vaporizable mercury; to provide a green color, a bulb 19 may be formed of yellow glass and filled with argon gas and a small amount of vaporizable mercury; and to provide other colors, a bulb 19 may be formed of suitable colored or plain glass and filled with other gases or mixtures thereof, as desired. As will be evident, the bulbs 19 may vary in color and/or gaseous content, so that the lighting system will produce a variety of colors to enhance the decorative effect.

As in Fig. 2, the sealed bulb 19 is also provided with a pair of electrodes 20 and 21 suitably positioned within the bulb, as in relatively closely spaced, parallel relation. The electrodes are connected by wires 22 in a relaxation oscillation circuit which includes a condenser or capacitor 23 and a resistor or resistance 24. As shown, condenser 23 is connected across electrodes 20 and 21, while resistor 24 is connected in series with electrode 20. A major portion of wires 22, and capacitor 23 and resistor 24 are mounted or embedded in a housing 25 preferably formed of plastic, either transparent or opaque or described, and sealed to bulb 19, which may be closed or the open end thereof closed by the housing. The housing 25 supports the bulb 19 and prongs 18, and permits any unit to be removed from or placed in the lighting system. The bulb may be conventional in shape, as the bulb 19 of Fig. 2, or, as in the alternative lighting unit L' of Fig. 6, may comprise a tube 26, which is substantially circular in shape, the electrodes 20' and 21' thereof being disposed closely adjacent each other and the capacitor and resistor being disposed relatively closely adjacent the ends of said tube, to reduce the length of the wire necessary to connect the electrodes thereto, thereby reducing the resistance of such wires. The lighting unit L' also includes an elongated housing 25' in which the capacitor 23, resistor 24 and prongs 18, as well as the wires 22' connecting the same with the electrodes 20' and 21', are embedded. Housing 25' may be provided with a metal cap 27 at one end to reduce wear on the same due to removal from and insertion into the socket.

The lighting units L or L' also may be connected in a circuit such as illustrated in Fig. 7, wherein the lighting unit L' is shown, partly diagrammatically, but it will be understood that lighting unit L may be connected therein. Thus, a battery 28 is shown as the source of unidirectional current, in this instance D. C., but it will be understood that such source of current may be rectified A. C. As in Figs. 6 and 7, the capacitor 23 is connected across the electrodes 20' and 21', whereas the resistor 24 is connected in series with one of the electrodes, such as electrode 20, but prior to the capacitor, i. e., between the capacitor connection and the source of current.

Figure 3:
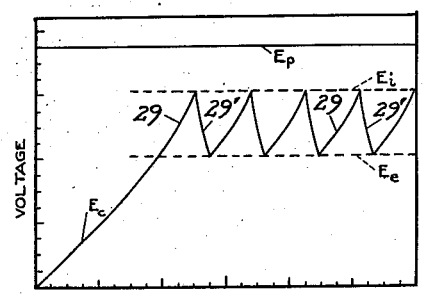
Fig. 3 is a chart illustrating voltage variations in the lighting units of the system of Fig. 1.

The capacitor and resistor connected in the above manner will produce voltage conditions such as illustrated in the chart of Fig. 3, wherein distances along the ordinate axis represent voltage and distances along the abscissa axis represent time. Assuming the power source to provide a constant voltage, which is represented by the line E$p$, the condenser voltage will vary along the line E$c$. Thus, as the condenser 23 is charged, the condenser voltage E$c$, which will also correspond to the potential difference between the electrodes 20 and 21 of tube 19 or 20' and 21' of tube 26, will increase until a voltage E$i$ is reached, which is the ignition or striking potential, i. e. the discharge voltage of the bulb 19 or tube 26. When the discharge voltage is reached, the current will discharge between the electrodes, thus exciting the gaseous material in the tube and causing the tube to light. However, the rapid dissipation of energy by such discharge will soon discharge the condenser 23, thus reducing the voltage to a value E$e$ which represents the extinction potential of the bulb or tube, whereupon the light in the tube will cease. But as soon as the extinction potential E$e$ is reached, the condenser will be charged again, so that the condenser voltage E$c$ rises again to the ignition potential E$i$, whereupon the cycle will be repeated. As will be evident, the downwardly slanting portions 29 of solid line E$c$, between dotted lines E$e$ and E$i$, represent periods during which the bulb is lighted, while the alternate and upwardly slanting portions 29' represent periods during which the bulb is not lighted. The recurring lighting periods produce a flashing, the frequency of which may be controlled by the relationship between the capacity of condenser 23, the resistance of the circuit as a whole, and the resistance of resistor 24. Thus, the frequency may be controlled so as to produce a series of relatively slow flashes, such as simulating the blinking of a star or a desired flashing of an electric sign, or so as to produce more than 25 flashes per second, which will give the impression to a normal person of continuous light.

The resistor 24 determines the time necessary to charge the condenser 23, and by changing the resistance of resistor 24, or by suitably altering the capacity of condenser 23, substantially any desired flashing periods may be produced. Also, by reducing the resistance of the leads to the electrodes, to a value as low as possible, the power required by the lighting units can be reduced considerably and the lighting efficiency also increased. While a D. C. source of current may be used, it is also possible—and for convenience, often more desirable—to utilize an A. C. power source. Depending upon the number of units, and also the desired voltage for each unit, or for other reasons, either half or full wave rectification may be used, as by vacuum tube rectification. If desired, bridge rectifiers, contact rectifiers, mercury arc rectifiers, or other types of rectifiers may be used, and two or three phase power supplies may be utilized, with appropriate transformers or other auxiliary equipment. The condenser 23 tends to smooth out variations due to A. C. rectification, so that the condenser voltage conditions will be substantially as shown in Fig. 3, although the line Ec may not be as smooth.

Figure 4:
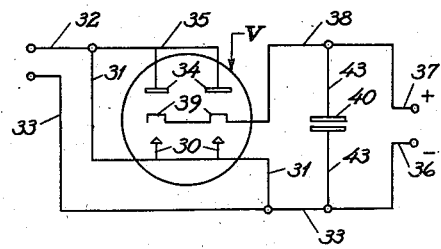
Fig. 4 is a circuit diagram, illustrating half wave rectification of A. C., as in a supply unit forming a part of the system of Fig. 1.
Figure 5:
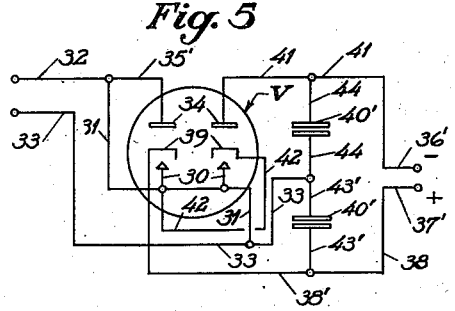
Fig. 5 is a similar circuit diagram, illustrating a voltage doubler used in the system.

The power unit P may be constructed so as to operate in accordance with the half wave rectification circuit of Fig. 4, or the voltage doubler circuit of Fig. 5, or, in fact, any other suitable rectifier unit. Thus, the power unit P may be provided with a vacuum tube V, which, as in Fig. 4, is provided with a pair of filaments 30 connected by wires 31 across A. C. power leads 32 and 33. Also, the tube V is provided with a pair of plates 34 connected in parallel by a wire 35 with lead 32. The negative terminal 36 is directly connected with power lead 33, while the positive terminal 37 is connected by a wire 38 with a dual grid 39. In addition, a capacitor 40 is connected by wires 43 across the terminals 36 and 37 to smooth out voltage variations. For voltage doubler rectification, as in Fig. 5, the same tube V may be utilized, the filaments 30 being connected across the power leads 32 and 33, as before, but only one of the plates 34 being connected by a wire 35' with power lead 32, the other plate 34 being connected by a wire 41 with the negative terminal 36. Also, only one of the grids 39 is connected by a wire 38' with the positive terminal 37, the other grid 39 being connected by a wire 42 with the opposite filament 30. In addition, two condensers or capacitors are utilized, one condenser 40' being connected by wires 43' between power lead 33 and wire 38' leading to positive terminal 37, while the other condenser 40' is connected by wires 44 between power lead 33 and wire 41 leading to negative terminal 36. In the half wave rectification circuit of Fig. 4, the voltage or potential across terminals 36 and 37 will be substantially the same as that across power leads 32 and 33, while in the voltage doubler rectification circuit of Fig. 5, the voltage across terminals 36' and 37' will be substantially double the voltage across the terminals of the circuit of Fig. 4. Depending upon the voltage desired and the number of units installed, half or full wave rectification may be utilized. For higher voltages, the same tube V will produce less amperage or current in the voltage doubler rectification circuit of Fig. 5 than in the half wave rectification circuit of Fig. 4.

The principles of this invention may also be applied to signs and the like, wherein relatively elongated tubes filled with neon or other suitable gas at a suitable pressure are utilized, as in Fig. 8. Thus, a suitable letter or other figure may be provided by each tube 45 of a sign S. Each tube may be formed of a single piece of continuous tubing bent to the desired shape to form the letter, or a desired letter or figure may be formed by two or more tubes, and any portion of the tube which should not be visible during the lighting period or periods may be blacked out in the well-known manner. Each end of the tubing of each letter is provided with an electrode, preferably similar to the electrodes 20' and 21' of the tube 26 of Fig. 6, and connected by leads 46 with units 47 containing a capacitor and resistor and connected in parallel across wires 48 and 49 leading from a power supply unit P'. The tubes 45 normally require a considerably higher voltage than the smaller bulbs of Figs. 2 and 6, for instance, and therefore a higher voltage must necessarily be produced by power unit P'. The voltage doubler rectification circuit of Fig. 5 is suitable for this purpose, and the circuit of each unit including a tube 45 is the same as the circuit illustrated in Fig. 7, with the exception that rectified A. C. is utilized instead of D. C., as explained previously. If desired, the resistor of each unit 47 may be made variable, as in the case of variable resistor 50 of Fig. 9, so that the period of flashing can be adjusted at will. Or, a single variable resistor, located at a desired position, such as adjacent power unit P', may be in series with each of the units through wire 49, so that all of the units may be controlled simultaneously.

In further accordance with this invention, an ornamental assembly O, as in Fig. 10, may be installed adjacent the ceiling of a lounge, dining room or the like, or above a space utilized for a similar purpose, to simulate stars blinking. The ornamental assembly O includes a cable 51 and a plurality of lighting units L" attached thereto, each lighting unit being constructed somewhat similarly to the units L of Figs. 1 and 2, by special connection sockets or connectors provided along cable 51 at spaced intervals. Cable 51 may be strung back and forth as shown, or disposed in any other suitable manner for positioning the lighting units with desired intervals therebetween.

As in Fig. 11, cable 51 may house a pair of wires 52 from which wires 53 lead to terminals 54, in a connector 55 which may be formed of suitable insulating material and also formed integrally with or attached to cable 51. A socket 56 is formed in connector 55, to receive housing 57 of lighting unit L", prongs 18 of which are adapted to engage terminals 54 of connector 55. Housing 57 is formed of suitable material, such as plastic, in which are embedded wires 22", condenser 23' and resistor 24', the condenser being connected across a pair of electrodes 59 disposed in a bulb 19' which is filled with a suitable gas at a suitable pressure, while resistor 24' is in series with one of the electrodes 59, as before. Housing 57 may also be provided with a metal cap 27' to reduce wear on the same, and a screw socket instead of a plug-in socket may be provided if desired. The wires 52 of cable 51 may be connected to a source of D. C., or a source of half or full wave rectified A. C., as in the previous embodiments.

Each condenser 23' may vary in capacity in accordance with the blinking period to be produced for the respective simulated stars. Thus, three or more groups of units may be utilized, interspersed at random, so that some of the units will blink more frequently than others. Also, each unit L" may be provided with a variable condenser 60, as in Fig. 12, so that the blinking effect of each lighting unit may be adjusted as desired, during installation.

Figure 13:
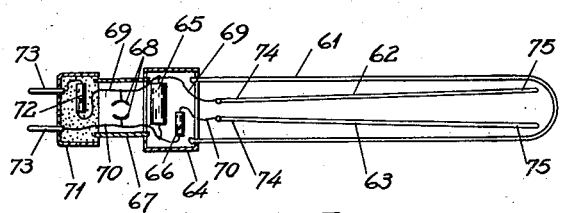
Fig. 13 is a longitudinal section of a further alternative lighting unit.

A further alternative lighting unit L'", adapted to produce a still different effect, is illustrated in Fig. 13. Unit L'" includes an elongated tube 61 having installed therein a pair of elongated, diverging electrodes 62 and 63, and filled with a suitable gas under a suitable pressure. A housing 64 connected with, or sealing tube 61, is formed of plastic or other suitable material, and embedded therein are a condenser 65 and resistor 66, the condenser being connected across electrodes 62 and 63, and the resistor 66 being in series with electrode 63, but between the condenser connection and the electrode, thus differing in the manner of its connection from the resistors of the previous units. A second tube 67, which also is a gaseous discharge tube, contains electrodes 68 connected to wires 69 and 70 leading respectively to electrodes 62 and 63 in tube 61. The unit is completed by a secondary housing 71 attached to and/or sealing tube 67, and having embedded therein a resistor 72 in series with elongated electrode 62 and one of prongs 73. As will be evident, secondary housing 71 is adapted to fit into a socket carrying suitable connections for transmitting D. C. or rectified A. C. through prongs 73 to the lighting unit.

As the voltage supplied through prongs 73 and wires 69 and 70 increases, condenser 65 is charged, until the ignition potential between the close ends 74 of electrodes 62 and 63 is reached, whereupon a glow proceeds along the length of the electrodes until it reaches the opposite and more widely spaced ends 75. The amount of current necessary for such a cathode glow effect requires only a relatively small voltage, which is limited by resistor 66 in series with electrode 63. Also, the elements of the circuit are so proportioned that as soon as the glow reaches the widely spaced ends 75, tube 67 discharges, so that the condenser 65 is discharged, whereupon the glow in tube 61 is extinguished. Condenser 65 is then recharged and the cycle repeated. The resistor 72 is utilized in regulating the frequency of flashing by regulating the rate at which the condenser 65 is charged. As will be evident, the condenser 65 may be placed in housing 71, if desired.

The effect of the operation of the lighting unit of Fig. 12 is to produce a traveling glow which terminates in a brilliant flash of light as tube 67 discharges. This creates an ornamental effect which is difficult to achieve in as simple and effective manner in any other way. In addition to purely decorative purposes, such an effect may be utilized to attract attention to signs, road danger signals, and other places where periodic flashes of relatively high intensity are desirable, yet total darkness between periods of flashes is not desired.

From the foregoing, it will be apparent that the lighting systems and units constructed in accordance with this invention fulfill to a marked degree the objects and requirements hereinbefore set forth. The lighting systems may be varied to obtain different effects, yet consist essentially of a source of unidirectional current and one or more lighting units. Each lighting unit also may be varied to accommodate different conditions, but consists essentially of a tube or bulb having a pair of electrodes, a condenser connected across the electrodes, and a resistor in series with one of the electrodes. As pointed out herein, the condenser may be variable, or the resistor may be variable, in order to vary the period of flashing. By initial construction, or by variation in the manner indicated, the period of flashing of the lighting units may be regulated so as to be relatively slow and therefore clearly visible to the normal eye, or sufficiently fast to simulate sustained light.

A valuable feature of this invention lies in the fact that, in all the embodiments illustrated herein, a brilliant flashing effect is obtained due to the fact that energy is stored in the condenser over a relatively long period, such as from one to two seconds, while the discharge interval is almost infinitesimal, probably being in the range of ten to twenty microseconds.

Another valuable feature of this invention is the connection of the lighting units in parallel on a single supply cord or cable. Heretofore, in gaseous discharge devices, it has been necessary to connect a plurality of units for series operation, which requires the voltage to be increased to a relatively high value. For instance, 3000 volts would be required for a set of ten 300 volt bulbs connected in series, whereas an equivalent set of bulbs can be connected in parallel and operated from a 300 volt source in accordance with the present invention.

A further feature of this invention, particularly valuable in Christmas tree lighting and the like, lies in the fact that the decorative effect may be varied at will by suitably placing a plurality of simple, compact lighting units which vary in the resistor or capacitor, to change the lighting period. All of the lighting units are operable from the same power unit or source, and are interchangeable with any other unit, so that the possible variations in decorative effect are numerous. Thus, some of the units may flash rapidly, others slowly, and still others simulate continuous light, while additional variations are possible by the use of different colors. Such variations in lighting effect cannot be obtained by either A. C. or D. C. lighting systems now currently in use for ornamental lighting, such as Christmas trees, irrespective of whether the bulbs are connected in series or in parallel.

It will be understood that embodiments of this invention other than those described may exist, and that various changes may be made therein, all without departing from the spirit and scope of this invention.

What is claimed is:

1. A lighting unit comprising a gas filled tube having a pair of elongated diverging electrodes, a condenser connected in parallel with said electrodes, a resistor connected in series with one said electrode and between said condenser and electrode, and a housing enclosing said condenser and resistor and attached to and sealing said tube.

2. A lighting unit comprising a gas filled tube having a pair of electrodes, a condenser connected in parallel with said electrodes, a resistor connected in series with one said electrode and between said condenser and electrode, a housing enclosing said condenser and resistor and attached to and sealing said tube; a gaseous discharge tube having spaced electrodes connected across the leads to said condenser, and a second resistor connected in series with one said condenser lead between said condenser and the power supply.

3. A lighting unit comprising a gas filled tube having a pair of elongated diverging electrodes; a condenser connected in parallel with said electrodes; a resistor connected in series with one said electrode and between said condenser and electrode; a housing enclosing said condenser and resistor, and attached to and sealing said tube; a gaseous discharge tube having spaced electrodes connected across the leads to said condenser, said housing being also attached to and sealing one end of said gaseous discharge tube; a second resistor connected in series with one said condenser lead; and a second housing enclosing said second resistor and attached to and sealing the opposite end of said gaseous discharge tube.

WILLIAM B. GREENLEE.

REFERENCES CITED

The following references are of record in the file of this patent:

UNITED STATES PATENTS

| Number | Name | Date |
|---|---|---|
| 548,133 | Moore | Oct. 15, 1895 |
| 926,956 | McComb | July 6, 1909 |
| 1,832,402 | Langer | Nov. 17, 1931 |
| 1,876,058 | Kayser | Sept. 6, 1932 |
| 1,985,058 | Rath | Dec. 18, 1934 |
| 2,013,012 | Tauschek | Sept. 3, 1935 |
| 2,073,359 | Witts | Mar. 9, 1937 |
| 2,109,998 | Inman | Mar. 1, 1938 |
| 2,235,667 | Blount | Mar. 18, 1941 |
| 2,282,340 | Pieplow | May 12, 1942 |
| 2,297,006 | Lohman | Sept. 20, 1942 |
| 2,341,541 | Grier | Feb. 15, 1944 |
| 2,375,130 | Perrin et al. | May 1, 1945 |
| 2,391,611 | Back | Dec. 25, 1945 |
| 2,392,333 | Morehead | Jan. 8, 1946 |